(12) United States Patent
Sasaki

(10) Patent No.: US 11,502,361 B2
(45) Date of Patent: Nov. 15, 2022

(54) ENERGY STORAGE APPARATUS

(71) Applicant: GS Yuasa International Ltd., Kyoto (JP)

(72) Inventor: Shun Sasaki, Kyoto (JP)

(73) Assignee: GS YUASA INTERNATIONAL LTD., Kyoto (JP)

( * ) Notice: Subject to any disclaimer, the term of this patent is extended or adjusted under 35 U.S.C. 154(b) by 374 days.

(21) Appl. No.: 16/470,938

(22) PCT Filed: Dec. 21, 2017

(86) PCT No.: PCT/JP2017/045850
§ 371 (c)(1),
(2) Date: Jun. 18, 2019

(87) PCT Pub. No.: WO2018/123784
PCT Pub. Date: Jul. 5, 2018

(65) Prior Publication Data
US 2020/0091478 A1    Mar. 19, 2020

(30) Foreign Application Priority Data

Dec. 28, 2016    (JP) .............................. JP2016-256635

(51) Int. Cl.
*H01M 50/20*    (2021.01)
*H01G 11/82*    (2013.01)
*H01M 50/502*   (2021.01)
*H01G 11/10*    (2013.01)

(52) U.S. Cl.
CPC ............ *H01M 50/20* (2021.01); *H01G 11/82* (2013.01); *H01M 50/502* (2021.01); *H01G 11/10* (2013.01); *H01M 2220/20* (2013.01)

(58) Field of Classification Search
None
See application file for complete search history.

(56) References Cited

U.S. PATENT DOCUMENTS 5,597,980 A * 1/1997 Weber .................. H02G 3/0418
                                              123/143 C
5,905,632 A   5/1999 Seto et al.
6,102,721 A   8/2000 Seto et al.
(Continued)

FOREIGN PATENT DOCUMENTS

CN    103066225 B  *  8/2015
JP    H 07-312211 A    11/1985
(Continued)

OTHER PUBLICATIONS

CN103066225B—machine translation (Year: 2015).*
International Search Report (ISR) (PCT Form PCT/ISA/210), in PCT/JP2017/045850, dated Feb. 20, 2018.

*Primary Examiner* — Haroon S. Sheikh
(74) *Attorney, Agent, or Firm* — McGinn I.P. Law Group, PLLC.

(57) ABSTRACT

An energy storage apparatus includes an energy storage device and an outer case. The outer case includes: an outer case body; and a lid body having a plurality of fixing portions, and fixed to the outer case body by the plurality of fixing portions. The plurality of fixing portions and the plurality of fixing portions are arranged at different positions in an arrangement direction of the outer case body and the lid body, and have the same rigidity.

15 Claims, 9 Drawing Sheets

(56) References Cited

U.S. PATENT DOCUMENTS

| | | | |
|---|---|---|---|
| 6,373,693 B1 | 4/2002 | Seto et al. | |
| 2010/0178548 A1 | 7/2010 | Baek | |
| 2011/0129725 A1* | 6/2011 | Baek | H01M 50/147 |
| | | | 429/179 |
| 2011/0293973 A1* | 12/2011 | Kim | H01M 50/166 |
| | | | 429/163 |
| 2014/0178716 A1* | 6/2014 | Wang | H01M 50/209 |
| | | | 429/7 |
| 2018/0111501 A1 | 4/2018 | Takeuchi et al. | |

FOREIGN PATENT DOCUMENTS

| | | |
|---|---|---|
| JP | H 09-6487 A | 1/1997 |
| JP | H 10-190254 A | 7/1998 |
| JP | 2008-091479 A | 4/2008 |
| JP | 2010-033796 A | 2/2010 |
| JP | 2010-165679 A | 7/2010 |
| JP | 2012-028241 A | 2/2012 |
| JP | 2013-152958 A | 8/2013 |
| JP | 2015-216237 A | 12/2015 |
| JP | 2018-065513 A | 4/2016 |

* cited by examiner

ENERGY STORAGE APPARATUS

TECHNICAL FIELD

The present invention relates to an energy storage apparatus which includes an energy storage device and an outer case.

BACKGROUND ART

Conventionally, there has been widely known an energy storage apparatus configured to house an energy storage device in an outer case. As such an energy storage apparatus, for example, patent document 1 discloses the configuration where a plurality of engaging portions formed on a battery cover engage with a body case so as to fix the battery cover to the body case.

PRIOR ART DOCUMENTS

Patent Documents

Patent Document 1: JP-A-10-190254

SUMMARY OF THE INVENTION

Problems to be Solved by the Invention

In this specification, the conventional energy storage apparatus disclosed in the above-mentioned patent document 1 is configured such that two members (the battery cover and the body case) which form the outer case are fixed to each other by the plurality of fixing portions (engaging portions), and the plurality of fixing portions having different shapes are arranged at positions having different heights. Accordingly, in the above-mentioned conventional energy storage apparatus, some fixing portions out of the plurality of fixing portions are likely to be easily broken and hence, there is a concern that such some fixing portions are damaged earlier than remaining fixing portions.

The present invention has been made in view of the above-mentioned drawback, and it is an object of the present invention to provide an energy storage apparatus which can suppress the occurrence of a case where some fixing portions out of a plurality of fixing portions are damaged earlier than remaining fixing portions in the configuration where two members which form an outer case are fixed to each other by the plurality of fixing portions.

Means for Solving the Problems

To achieve the above-mentioned object, an energy storage apparatus according to an aspect of the present invention is an energy storage apparatus which includes an energy storage device and an outer case, wherein the outer case includes: a first outer case; and a second outer case having a plurality of fixing portions and fixed to the first outer case by the plurality of fixing portions, and the plurality of fixing portions are arranged at different positions in an arrangement direction of the first outer case and the second outer case, and have the same rigidity.

With such a configuration, in the energy storage apparatus, the second outer case is fixed to the first outer case by the plurality of fixing portions, the plurality of fixing portions are disposed at the different positions in the arrangement direction of the first outer case and the second outer case, and have the same rigidity. That is, although the plurality of fixing portions of the second outer case have the different arrangement heights, the plurality of fixing portions have the same rigidity and hence, the plurality of fixing portions have substantially the same breaking property whereby it is possible to suppress the occurrence of a case where some fixing portions are broken earlier than remaining fixing portions. In this manner, according to the energy storage apparatus, in the configuration where two members (the first outer case and the second outer case) which form the outer case are fixed to each other by the plurality of fixing portions, it is possible to suppress the occurrence of a case where some fixing portions out of the plurality of fixing portions are damaged earlier than the remaining fixing portions.

The plurality of fixing portions may be equal with respect to at least one of a height, a thickness, and a width.

With such a configuration, the plurality of fixing portions of the second outer case are equal with respect to at least one of the height, the thickness, and the width and hence, the plurality of fixing portions form portions which have the same rigidity.

The plurality of fixing portions may have the same shape and the same size.

With such a configuration, the plurality of fixing portions of the second outer case have the same shape and the same size and hence, the plurality of fixing portions form portions which have the same rigidity.

The plurality of fixing portions may have the same contact area with the first outer case.

With such a configuration, the plurality of fixing portions of the second outer case have the same contact area with the first outer case and hence, the same stress is applied to the plurality of fixing portions whereby it is possible to suppress the occurrence of a case where some fixing portions out of the plurality of fixing portions are damaged earlier than the remaining fixing portions.

The first outer case may have an intermediate member disposed between the energy storage device and the second outer case, and the second outer case may be fixed to the intermediate member by at least one fixing portion out of the plurality of fixing portions.

With such a configuration, the second outer case is fixed to the intermediate member which the first outer case has by at least one fixing portion. That is, the second outer case can be fixed to the first outer case by fixing the second outer case to the intermediate member.

The intermediate member may be the bus bar frame which holds a bus bar connected to the energy storage device, and the second outer case may be fixed to the bus bar frame by making the at least one fixing portion engage with the bus bar frame.

With such a configuration, by making at least one fixing portion of the second outer case engage with the bus bar frame which forms the intermediate member, the second outer case is fixed to the bus bar frame. That is, the second outer case can be fixed to the first outer case by making the at least one fixing portion engage with the bus bar frame.

The recessed portion may be formed on the second outer case by arranging the at least one fixing portion inside the outer surface of the second outer case, and a portion of the bus bar frame with which the at least one fixing portion engages may be disposed in the recessed portion.

With such a configuration, at least one fixing portion and the engaging portion engage with each other by arranging the at least one fixing portion of the second outer case and the engaging portion of the bus bar frame in the recessed portion of the second outer case. Accordingly, it is possible to suppress the occurrence of a case where the at least one fixing portion and the engaging portion protrude outward from the outer surface of the second outer case.

An external harness which is electrically connected with the energy storage device may be disposed outside a portion of the second outer case having a fixing portion disposed on a first outer case side in the arrangement direction out of the plurality of fixing portions.

With such a configuration, the external harness is disposed outside the portion of the second outer case having the fixing portion on the first outer case side. That is, by disposing the external harness outside a low portion of the second outer case, it is possible to effectively make use of a space formed outside the energy storage apparatus by lowering the height of the second outer case.

An electric component which is electrically connected with the energy storage device may be disposed inside a portion of the second outer case having the fixing portion disposed on a second outer case side in the arrangement direction out of the plurality of fixing portions.

With such a configuration, the electric component is disposed inside the portion of the second outer case having the fixing portion on the second outer case side. That is, by disposing the electric component such as a printed circuit board inside a high portion of the second outer case, it is possible to effectively make use of a space formed inside the energy storage apparatus by increasing the height of the second outer case.

An energy storage apparatus according to another aspect of the present invention is an energy storage apparatus which includes an energy storage device and an outer case, wherein the outer case includes: a first outer case; and a second outer case having a plurality of fixing portions and fixed to the first outer case by the plurality of fixing portions, the second outer case has a high portion and a low portion, and out of the plurality of fixing portions, the fixing portion disposed at the high portion and the fixing portion disposed at the low portion are formed with a same length in a height direction.

With such a configuration, in the energy storage apparatus, the second outer case is fixed to the first outer case by the plurality of fixing portion. Out of the plurality of fixing portions, the fixing portion disposed on the high portion of the second outer case and the fixing portion disposed on the low portion of the second outer case are formed with the same length in the height direction. That is, although the plurality of fixing portions of the second outer case have the different arrangement heights, the plurality of fixing portions are formed with the same length in the height direction and hence, the plurality of fixing portions have substantially the same breaking property whereby it is possible to suppress the occurrence of the case where some fixing portions are broken earlier than the remaining fixing portions. In this manner, according to the energy storage apparatus, in the configuration where two members (the first outer case and the second outer case) which form the outer case are fixed to each other by the plurality of fixing portions, it is possible to suppress the occurrence of a case where some fixing portions out of the plurality of fixing portions are damaged earlier than the remaining fixing portions.

The present invention can be realized not only in the form of an energy storage apparatus but also in the form of an outer case (a first outer case and a second outer case) which the energy storage apparatus includes.

Advantages of the Invention

According to the energy storage apparatus of the present invention, in the configuration where two members which form the outer case are fixed to each other by the plurality of fixing portions, it is possible to suppress the occurrence of a case where some fixing portions out of the plurality of fixing portions are damaged earlier than the remaining fixing portions.

MODE FOR CARRYING OUT THE INVENTION

Hereinafter, an energy storage apparatus according to an embodiment of the present invention is described with reference to drawings. The embodiment described hereinafter is a comprehensive and specific example of the present invention. In the embodiment described hereinafter, numerical values, shapes, materials, constitutional elements, the arrangement positions and connection states of the constitutional elements and the like are merely examples, and these are not intended to be used for limiting the present invention. Further, out of the constitutional elements in the embodiment described hereinafter, the constitutional elements which are not described in independent claims describing an uppermost concept are described as arbitrary constitutional elements. In the respective drawings, the respective constitutional elements are not described strictly accurately in size or the like.

In the description made hereinafter and drawings, an arrangement direction of the energy storage devices, an opposedly facing direction of long side surfaces of a case of the energy storage device, and a thickness direction of the case are defined as an X axis direction. An arrangement direction of electrode terminals of one energy storage device and an opposedly facing direction of short side surfaces of the case of the energy storage device are defined as a Y axis direction. Further, an arrangement direction of an outer case body and a lid of the energy storage apparatus, an arrangement direction of a case body and a lid of the energy storage device and a vertical direction are defined as a Z axis direction. These X axis direction, Y axis direction, and Z axis direction are directions intersecting with each other (orthogonal to each other in this embodiment). There may be also a case where the Z axis direction does not agree with the vertical direction depending on a use state of the energy storage apparatus. However, in the description made hereinafter, for the sake of convenience, the description is made by assuming that the Z axis direction agrees with the vertical direction. Further, in the description made hereinafter, the plus side in the X axis direction indicates an arrow direction side of an X axis, and the minus side in the X axis direction indicates a side opposite to the plus side in the X axis direction. The same also goes for the Y axis direction and the Z axis direction.

(Embodiment)

Figure 1:
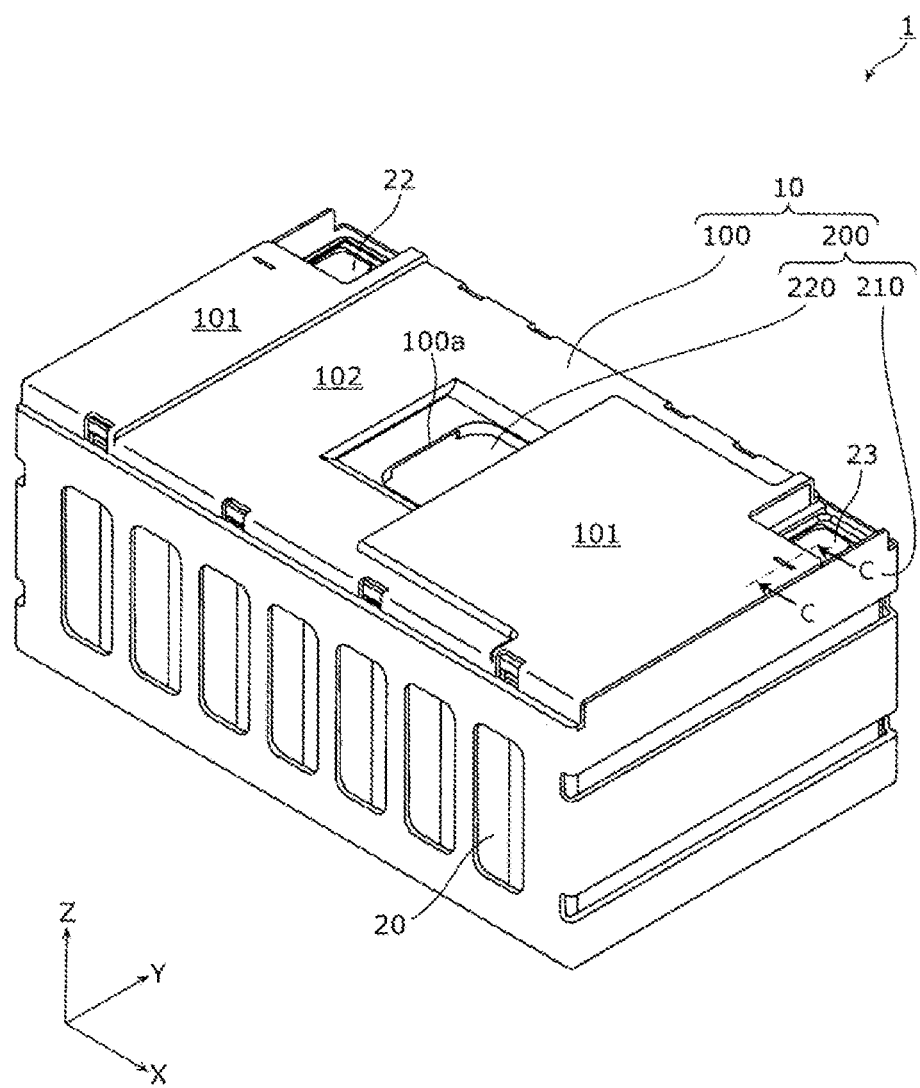
FIG. 1 is a perspective view showing an external appearance of an energy storage apparatus according to an embodiment.
Figure 2:
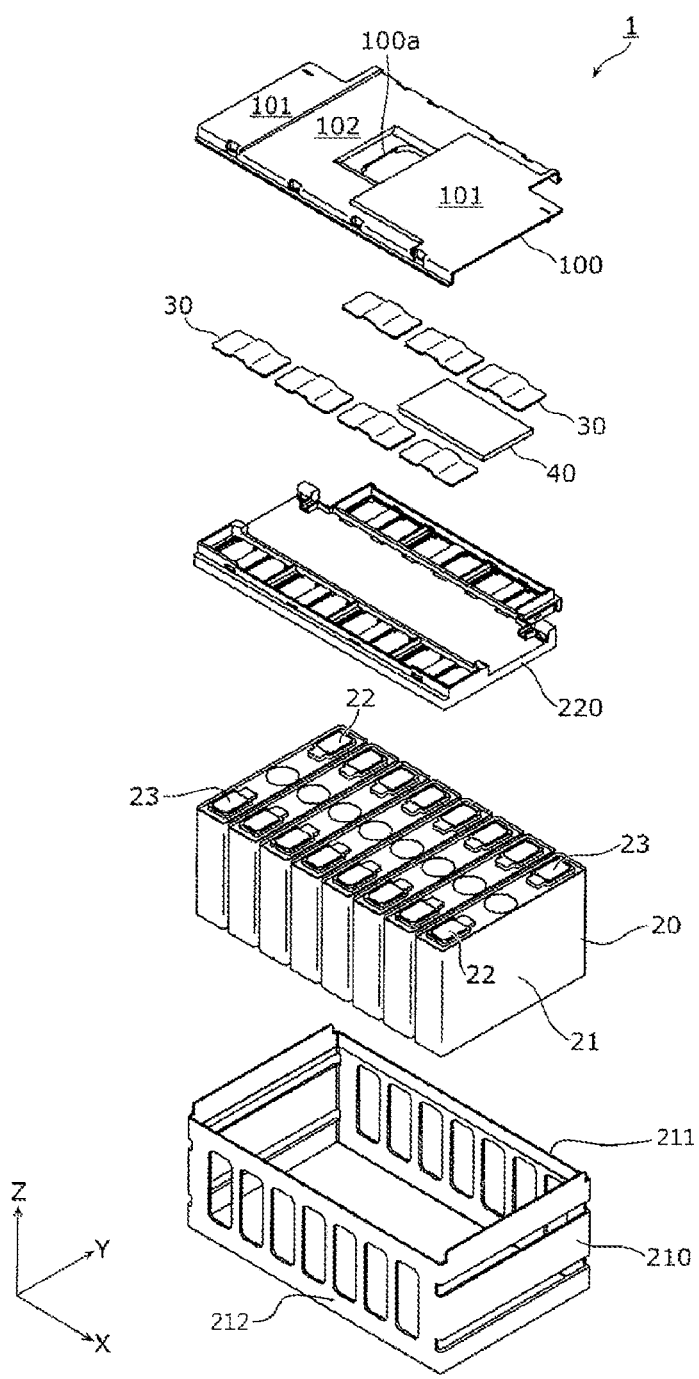
FIG. 2 is an exploded perspective view showing respective constitutional elements in a state where the energy storage apparatus according to the embodiment is disassembled from each other.

First, the overall configuration of an energy storage apparatus 1 according to an embodiment of the present invention is described with reference to FIG. 1 and FIG. 2. FIG. 1 is a perspective view showing an external appearance of the energy storage apparatus 1 according to this embodiment. FIG. 2 is an exploded perspective view showing respective constitutional elements in a state where the energy storage apparatus 1 according to this embodiment is disassembled from each other.

The energy storage apparatus 1 is an apparatus which can charge electricity from the outside of the energy storage apparatus 1 therein or can discharge electricity to the outside of the energy storage apparatus 1. For example, the energy storage apparatus 1 is a battery module used for power storage application, power source application or the like. To be more specific, the energy storage apparatus 1 is used as a battery for driving a mobile body such as an automobile including an electric vehicle (EV), a hybrid electric vehicle (HEV) and a plug-in hybrid electric vehicle (PHEV), a motorcycle, a water craft, a snowmobile, an agricultural machine or a construction machine or for starting an engine of such a mobile body.

In this embodiment, as shown in FIG. 1 and FIG. 2, the energy storage apparatus 1 includes: an outer case 10 formed of a lid body 100 and an outer case body 200; a plurality of energy storage devices 20 housed in the outer case 10; a plurality of bus bars 30; and a printed circuit board 40.

The outer case 10 is a case (module case) having a rectangular shape (box shape) formed as a member for housing contents of the energy storage apparatus 1. The outer case 10 may be also referred to as a holding member for holding the contents of the energy storage apparatus 1. That is, the outer case 10 is disposed outside the energy storage devices 20, the bus bars 30, the printed circuit board 40 and the like, enables the arrangement of the energy storage devices 20 and the like at predetermined positions in the outer case 10, and protects the energy storage devices 20 and the like from an impact or the like. For example, the outer case 10 is made of an insulating material such as polycarbonate (PC), polypropylene (PP), polyethylene (PE), a polyphenylene sulfide resin (PPS), polybutylene terephthalate (PBT) or an ABS resin. Accordingly, the outer case 10 prevents the energy storage devices 20 and the like from coming into contact with metal members or the like.

In this embodiment, the outer case 10 includes the flat rectangular-shaped lid body 100 which forms a lid body (outer lid) of the outer case 10, and the outer case body 200 which forms a body of the outer case 10. The outer case body 200 includes: a bottomed rectangular cylindrical-shaped housing 210 having an opening 211; and a flat rectangular-shaped intermediate member 220 which is disposed in the opening 211 of the outer case 10. That is, the intermediate member 220 is disposed so as to close the opening 211 of the housing 210, and the lid body 100 is disposed on the intermediate member 220. The outer case body 200 (the housing 210 and the intermediate member 220) is one example of a first outer case, and the lid body 100 is one example of a second outer case.

The housing 210 is formed in a bottomed rectangular cylindrical shape, and includes a rectangular bottom wall and side walls 212 which are raised from the bottom wall. Upper ends of the side wall 212 form the opening 211, and the energy storage devices 20 are housed in the housing 210 from the opening 211.

The lid body 100 includes: an upper wall 105 which covers the opening 211 of the housing 210 from above of the intermediate member 220; and side walls 106. The side walls 106 are formed on peripheral edges of the upper wall 105. Further, the upper wall 105 has a stepped portion. To be more specific, the upper wall 105 has: high position portions 101 which are high portions having a large height (a height in the Z axis direction) on both end portions in the X axis direction respectively; and a low position portion 102 which is a low height portion at a center portion in the X axis direction. A through hole 100a is formed in a center portion of the lid body 100, that is, in the low position portion 102.

The intermediate member 220 is a bus bar frame (bus bar plate) which holds the bus bars 30 connected to the energy storage devices 20, and is disposed between the energy storage devices 20 and the lid body 100. That is, the intermediate member 220 has a floor portion 226, and the bus bars 30, the printed circuit board 40, electric components such as relays, wirings and the like (not shown in the drawing) are held on the floor portion 226. The intermediate member 220 is disposed for providing insulation between the bus bars 30, the printed circuit board 40 and the like and other members, and for performing the restriction of positions of the bus bars 30, the printed circuit board 40 and the like. The floor portion 226 also includes bus bar arranging portions 227 for arranging the bus bars at portions corresponding to electrode terminals 22, 23 of the energy storage devices 20. Further, a peripheral wall 225 is formed on a peripheral edge of the floor portion 226. Protruding portions not shown in the drawing are formed on an outer surface of the peripheral wall 225. Due to the fitting engagement between the protruding portions and recessed portions (not shown in the drawing) formed on the side walls 212 of the housing 210, the housing 210 and the intermediate member 220 are fixed to each other.

With such a configuration, the plurality of energy storage devices 20 are housed in the housing 210, and the intermediate member 220 is placed on the plurality of energy storage devices 20 (on the plus side in a Z axis direction) and is positioned with respect to the energy storage devices 20. The plurality of bus bars 30, the printed circuit board 40 and the like are placed on the intermediate member 220 and positioned with respect to the intermediate member 220. With such a configuration, the plurality of bus bars 30 are connected to the energy storage devices 20 while being positioned with respect to the energy storage devices 20, and the printed circuit board 40 is connected to the wirings and the like while being positioned with respect to the wirings and the like. The lid body 100 is disposed on the intermediate member 220 while being positioned with respect to the intermediate member 220. To be more specific, the lid body 100 is positioned and disposed such that the side walls 106 of the lid body 100 cover the peripheral wall 225 of the intermediate member 220 from the outside.

The lid body 100, the housing 210, and the intermediate member 220 may be formed using members made of same material or may be formed using members made of different materials. In this embodiment, the lid body 100 is fixed to the intermediate member 220. The fixing configuration between the lid body 100 and the intermediate member 220 (the configuration of the lid body 100 and the configuration of the intermediate member 220) is described in detail later.

The energy storage device 20 is a secondary battery (battery cell) which can charge or discharge electricity. To be more specific, the energy storage device 20 is a nonaqueous electrolyte secondary battery such as a lithium ion secondary battery. The energy storage device 20 has a flat rectangular parallelepiped shape (angular shape). In this embodiment, eight energy storage devices 20 are arranged in the X axis direction. A shape of the energy storage device 20, and the number of energy storage devices 20 to be arranged are not limited. The energy storage device 20 is not limited to a nonaqueous electrolyte secondary battery, and may be a secondary battery other than a nonaqueous electrolyte secondary battery, or may be a capacitor. Further, the energy storage device 20 may be a primary battery where a user can use stored electricity without charging.

The energy storage device 20 includes a metal-made case 21, and a positive electrode terminal 22 and a negative electrode terminal 23 which are metal-made electrode terminals are mounted on a lid portion of the case 21. Although a gas release valve for releasing a pressure by discharging a gas when a pressure in the case 21 is increased is also mounted on the lid portion of the case 21, the detailed description of the gas release valve is omitted. In the case 21, an electrode assembly (also referred to as an energy storage element or a power generating element), current collectors (a positive electrode current collector and a negative electrode current collector) and the like are disposed, and an electrolyte solution (nonaqueous electrolyte) or the like is sealed in the case 21. However, the detailed description of such a configuration is omitted.

The bus bars 30 are rectangular plate-like members which are disposed on the plurality of energy storage devices 20 (on the intermediate members 220) and are provided for electrically connecting electrode terminals of the plurality of energy storage devices 20 to each other. The bus bar 30 is formed of a conductive member made of metal such as copper, a copper alloy, aluminum, or an aluminum alloy, for example. In this embodiment, the bus bars 30 connect eight energy storage devices 20 in series such that each bus bar 30 connects the positive electrode terminal 22 of the energy storage device 20 and the negative electrode terminal 23 of the neighboring energy storage device 20 to each other. However, the combination of the series connection and the parallel connection of the energy storage devices 20 is not particularly limited.

The positive electrode terminal 22 of the energy storage device 20 on the minus side in the X axis direction and on the plus side in the Y axis direction and the negative electrode terminal 23 of the energy storage device 20 on the plus side in the X axis direction and on the plus side in the Y axis direction which form outermost electrode terminals are disposed in an exposed manner from the lid body 100. These outermost electrode terminals are connected to external conductive members directly or are connected to external conductive members via external terminals (not shown in the drawing). With such a configuration, the energy storage apparatus 1 can charge electricity from the outside of the energy storage apparatus 1 and can discharge electricity to the outside of the energy storage apparatus 1.

The printed circuit board 40 is a control board which is placed on the intermediate member 220, and is fixed to the intermediate member 220. The printed circuit board 40 is electrically connected to the plurality of energy storage devices 20 by wirings or the like, and acquires, monitors, and controls a state of the plurality of energy storage devices 20. To be more specific, a control circuit (not shown in the drawing) is mounted on the printed circuit board 40. The control circuit acquires various information such as charging states, discharging states, voltage values, current values, and temperatures of the plurality of energy storage devices 20, controls turning on and off of the relays, and performs communication with other equipment. The printed circuit board 40 is one example of the electric component.

The printed circuit board 40 is disposed at a position on the intermediate member 220 on the plus side in the X axis direction. That is, the printed circuit board 40 is disposed between the intermediate member 220 and the high position portion 101 of the lid body 100. The printed circuit board 40 is connected to an external harness (not shown in the drawing) which is an external wiring of the energy storage apparatus 1 through the through hole 100a, and the external harness is disposed above the low position portion 102. In this manner, the printed circuit board 40 is disposed inside the high position portion 101, and the external harness is disposed outside the low position portion 102. As the external harness disposed outside the low position portion 102, any wiring may be adopted provided that the wiring is electrically connected to the energy storage devices 20. A connector (not shown in the drawing) may be disposed outside the low position portion 102, and the external harness and the energy storage devices 20 may be electrically connected to each other via the connector. Further, the connector may be disposed inside the through hole 100a or may be fixed to the printed circuit board 40.

As described above, in the lid body 100, the printed circuit board 40 which forms an electric component electrically connected to the energy storage devices 20 is disposed inside the high position portion 101 which forms a portion having fixing portions 110 described later. In the lid body 100, the external harness which is electrically connected to the energy storage devices 20 is disposed outside the low position portion 102 which forms a portion having fixing portions 120 described later.

To be more specific, the description is made with respect to a mode where the energy storage apparatus 1 is used. The previously-mentioned electric vehicle (EV) or the like includes an energy storage pack in which a plurality of energy storage apparatuses 1 are mounted. In the electric vehicle (EV) or the like, there has been a demand for saving a space for accommodating a battery pack. For example, to achieve such space saving, it has been required to make a size of a battery pack or an energy storage apparatus in a height direction (Z axis direction) as small as possible. In this case, to make use of a space effectively as much as possible, it is convenient to provide concavo-convex portions such as a high position portion and a low position portion on an upper surface of the energy storage apparatus.

In this embodiment, the external harnesses are respectively provided for the respective energy storage apparatuses 1 and hence, a predetermined space for arranging a bundle of a plurality of external harnesses becomes necessary. Therefore, in the energy storage pack of this embodiment which intends to realize space saving, the plurality of energy storage apparatuses 1 are arranged in the Y axis direction shown in FIG. 1, and the low position portions 102 of the plurality of energy storage apparatuses 1 are arranged along the Y axis direction such that widths of the low position portions 102 in the X axis direction are aligned with each other. External harnesses each of which is connected to the energy storage apparatus different from the own energy storage apparatus and disposed adjacently to the own energy storage apparatus are disposed on upper surfaces of the continuously formed low position portions 102 in the Z axis direction. With such a configuration, the low position portions 102 of the energy storage apparatuses 1 can be utilized as a path for the external harnesses.

When the plurality of energy storage apparatuses 1 are used in an arranged manner, as in the case of this embodiment, a mode where the external harness is disposed on the low position portion 102, that is, a mode where the external harness is connected to the energy storage apparatus 1 on the lid body 100 is preferable from a viewpoint of operability. On the other hand, in the case where the external harness is connected to the side surface of the energy storage apparatus 1, there may be a case where an interval of the plurality of energy storage apparatuses 1 becomes narrow due to saving of a space so that operability is deteriorated.

Figure 3:
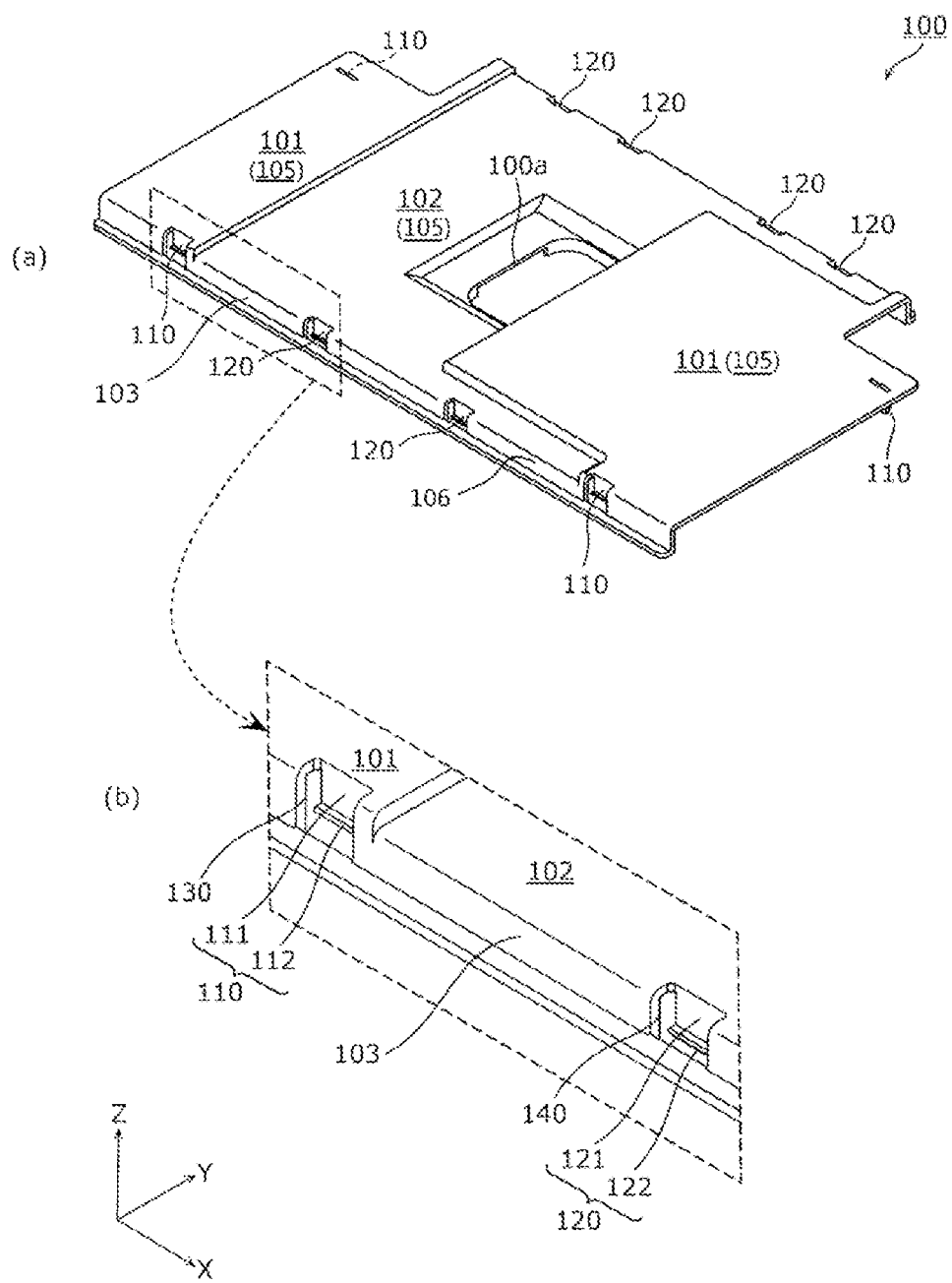
FIG. 3 is a perspective view showing the configuration of a lid body according to the embodiment.
Figure 4:
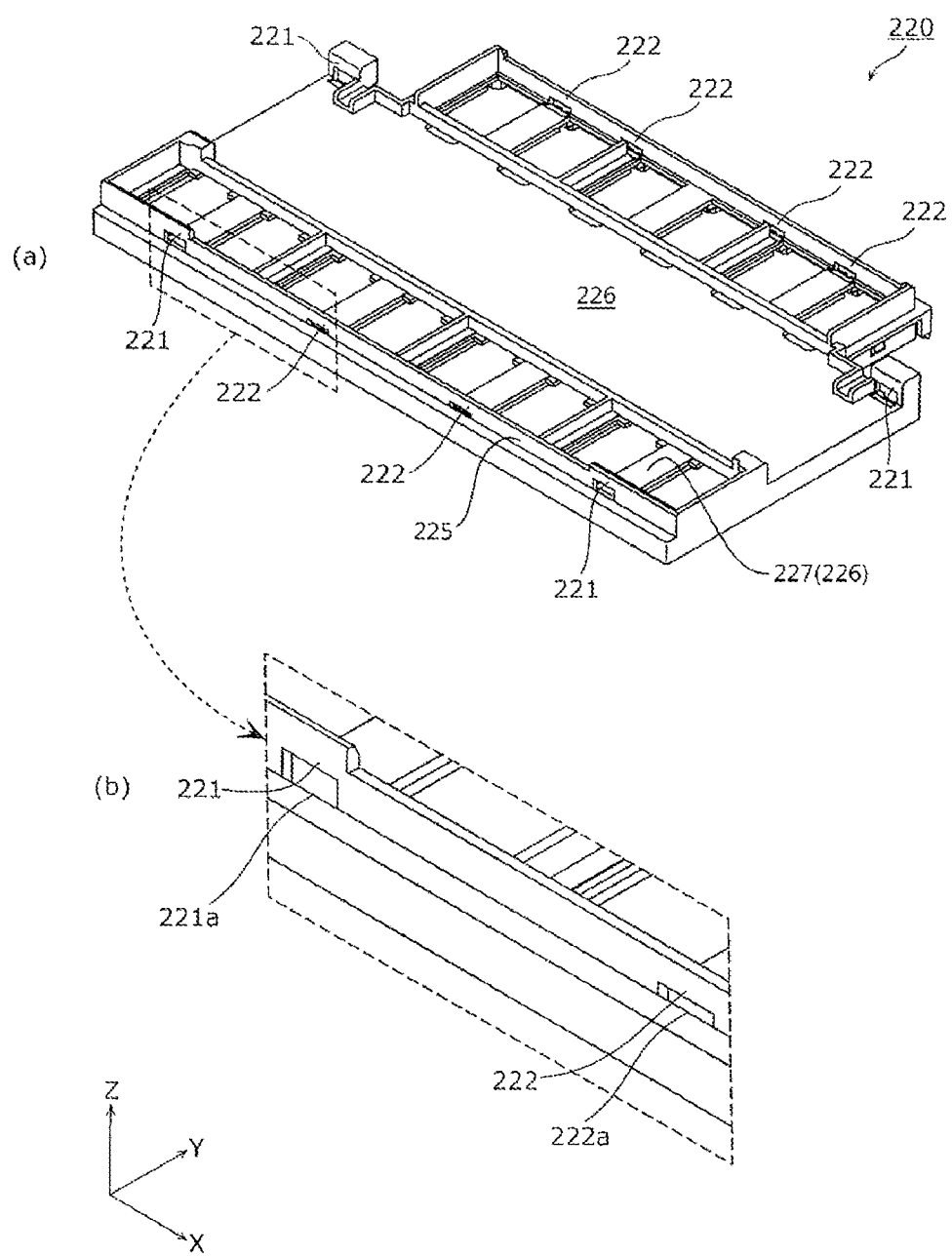
FIG. 4 is a perspective view showing the configuration of an intermediate member according to the embodiment.
Figure 7:
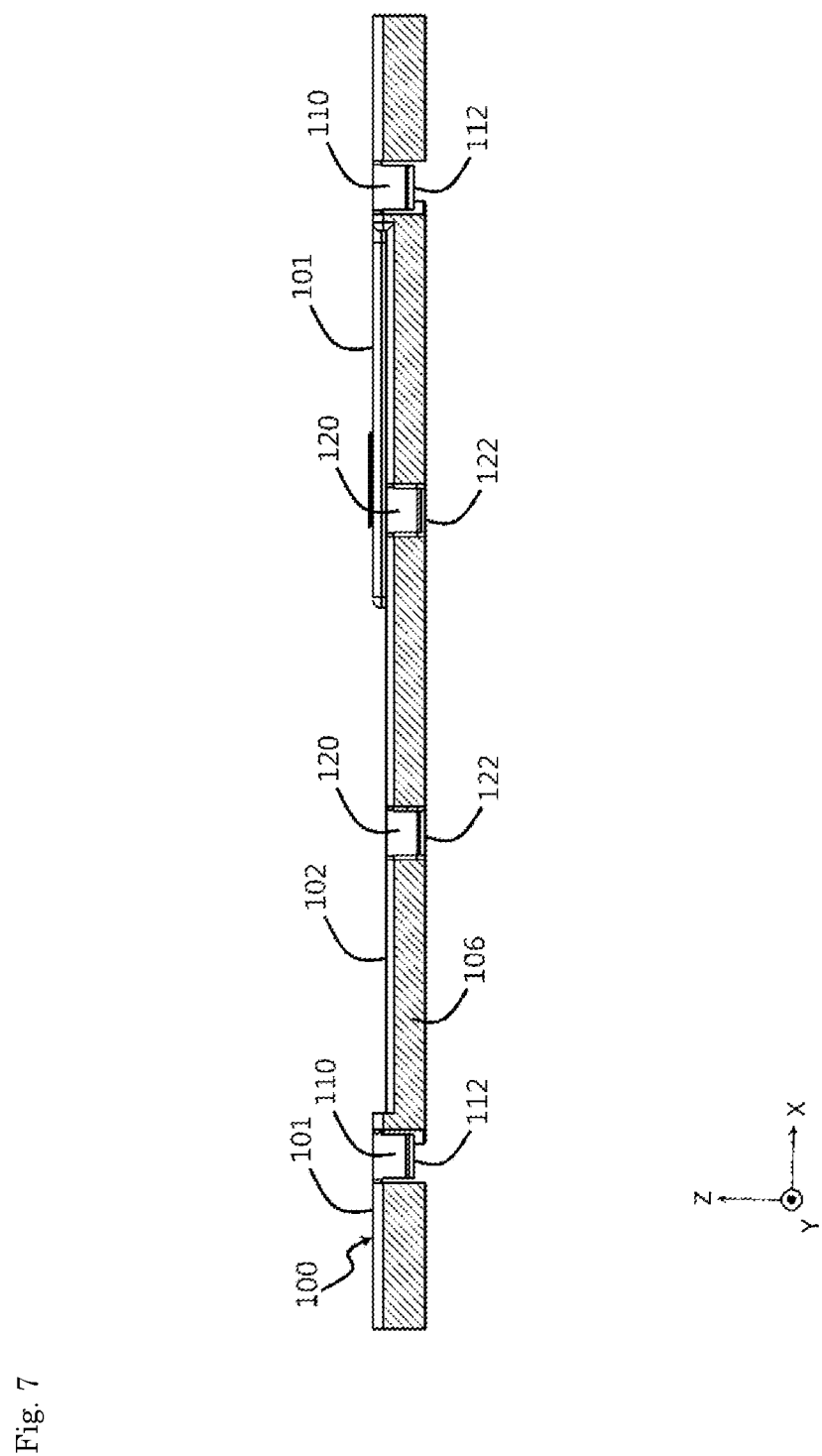
FIG. 7 is a cross-sectional view of the lid body according to the embodiment at a position taken along line A-A in FIG. 5B.
Figure 8:
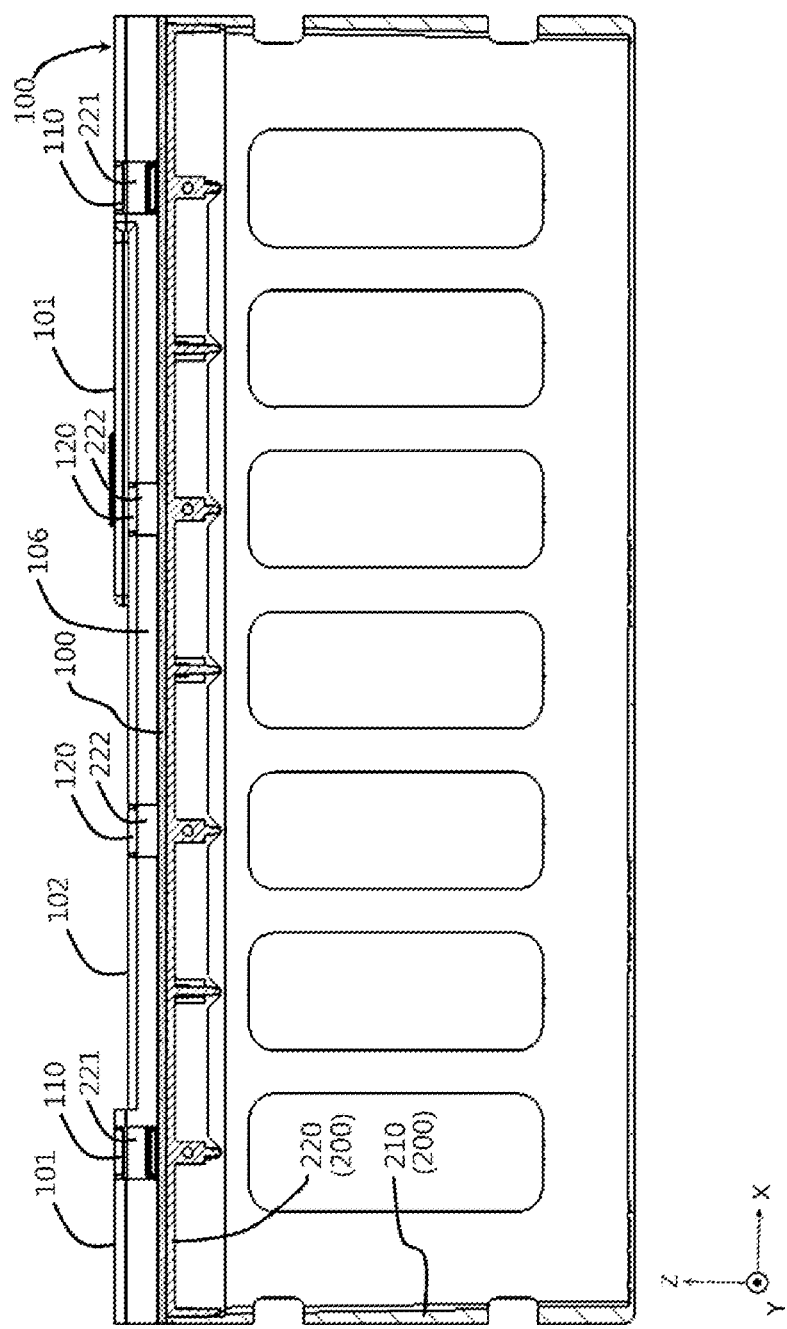
FIG. 8 is a cross-sectional view of the energy storage apparatus according to the embodiment at a position taken along line B-B in FIG. 5B.

Next, the configuration of the lid body 100, the configuration of the intermediate member 220, and the fixing configuration between the lid body 100 and the intermediate member 220 are described in detail. FIG. 3 is a perspective view showing the configuration of the lid body 100 according to this embodiment. FIG. 3(b) is a perspective view showing a portion surrounded by a dotted line in FIG. 3(a) in an enlarged manner. FIG. 4 is a perspective view showing the configuration of the intermediate member 220 according to this embodiment. FIG. 4(b) is a perspective view showing a portion surrounded by a dotted line in FIG. 4(a) in an enlarged manner. FIG. 7 is a cross-sectional view showing the configuration of the lid body 100 according to this embodiment, and is a cross-sectional view parallel to the Z axis at a portion of the side wall 106 of the lid body 100 (cross-sectional view of the lid body 100 at a position taken along line A-A in FIG. 5B). FIG. 8 is a cross-sectional view showing the configuration of the energy storage apparatus 1 according to this embodiment, and is a cross-sectional view parallel to the Z axis at a peripheral portion of the energy storage apparatus 1 on the minus side in the Y axis direction (cross-sectional view at a position taken along line B-B in FIG. 5B). In FIG. 8, the energy storage devices 20 are not shown.

As shown in FIG. 3, FIG. 7, and FIG. 8, the lid body 100 has the plurality of fixing portions 110, 120. In this embodiment, the plurality of fixing portions 110 and the plurality of fixing portions 120 are disposed at different positions in an arrangement direction of the lid body 100 and the outer case body 200 (or in an arrangement direction of the lid body 100 and the intermediate member 220, that is, in the Z axis direction). That is, out of the plurality of fixing portions 110, 120, the fixing portions 110 are fixing portions disposed on a lid body 100 (upper wall 105) side in the arrangement direction. On the other hand, out of the plurality of fixing portions 110, 120, the fixing portions 120 are fixing portions disposed on an outer case body 200 side (intermediate member 220 side) in the arrangement direction.

To be more specific, the fixing portions 110 are disposed at the high position portions 101 which are portions of the lid body 100 having a large height (a height in the Z axis direction), and the fixing portions 120 are disposed at the low position portion 102 which is a portion of the lid body 100 having a small height. That is, the fixing portions 110 are disposed at the large-height position of the lid body 100, and the fixing portions 120 are disposed at the small-height position of the lid body 100.

To be further more specific, the fixing portions 110 are provided to end portions on the plus side and the minus side in the Y axis direction of the high position portion 101 on the minus side in the X axis direction respectively. Further, the fixing portions 110 are provided also to end portions on the plus side and the minus side in the Y axis direction of the high position portion 101 on the plus side in the X axis direction respectively. Four fixing portions 120 are provided to an end portion of the low position portion 102 on the plus side in the Y axis direction, and two fixing portions 120 are provided to an end portion of the low position portion 102 on the minus side in the Y axis direction. With reference to FIG. 3, out of the plurality of fixing portions 110, two fixing portions 110 which are provided to both end portions in the X axis direction of the end portion on the plus side in the Y axis direction are disposed closer to an inner side of the upper wall 105 of the lid body 100. Other fixing portions 110 and the fixing portions 120 are formed on the periphery of the upper wall 105.

On the lid body 100, the fixing portions 110, 120 are disposed toward an inner side in the Y axis direction from an outer surface 103 of the side wall 106 of the lid body 100 so that recessed portions 130 and 140 are formed. That is, the recessed portions 130 are recessed portions which are formed by being recessed toward an inner side in the Y axis direction from the outer surface 103 of the high position portion 101 of the lid body 100, and the recessed portions 130 are provided corresponding to the plurality of fixing portions 110 respectively. The recessed portions 140 are recessed portions which are formed by being recessed toward an inner side in the Y axis direction from the outer surface 103 of the low position portion 102 of the lid body 100, and the recessed portions 140 are provided corresponding to the plurality of fixing portions 120 respectively.

As shown in FIG. 7, the plurality of fixing portions 110 and the plurality of fixing portions 120 are formed to have the same shape and the same size. To be more specific, the plurality of fixing portions 110 and the plurality of fixing portions 120 are formed to have the same width in the X axis direction, the same height in the Z axis direction, and the same thickness. The lid body 100 is an integrally molded product and hence, the plurality of fixing portions 110 and the plurality of fixing portions 120 are respectively made of the same material. Accordingly, the plurality of fixing portions 110 and the plurality of fixing portions 120 have the same rigidity. To be more specific, the plurality of fixing portions 110 and the plurality of fixing portions 120 have the same rigidity in any directions including the X axis direction, the Y axis direction, the Z axis direction, and directions obtained by combining these axial directions.

"the same" in the expression "have the same shape and the same size" and in the expression "have the same rigidity" means a concept which includes not only the case where the fixing portions 110 and the fixing portions 120 have the completely same shape and the completely same size, and have the completely same rigidity but also the case where the fixing portions 110 and the fixing portions 120 have substantially the same shape and substantially the same size, and have substantially the same rigidity and hence, some tolerances are allowable. The expression "the same" which appear hereinafter should be also construed in the same manner.

"have the same rigidity" means the state where the fixing portions 110 and the fixing portions 120 exhibit the same strength against an external force, and can be defined as the state where the fixing portions 110 and the fixing portions 120 exhibit the same change in size against a bending force or a twisting force applied to the fixing portions 110 and the fixing portions 120, for example. That is, for example, "the fixing portions 110 and the fixing portions 120 have the same rigidity" means that when center portions of regions having the same size of the fixing portion 110 and the fixing portion 120 are pushed by the same force, a change in size (a deflection amount) of the fixing portion 110 and a change in size (a deflection amount) of the fixing portion 120 are equal to each other. It may be also defined such that a force necessary for generating the same change in size is equal between the fixing portion 110 and the fixing portion 120. Further, it may be also defined such that the fixing portion 110 and the fixing portion 120 have the same rigidity when the fixing portion 110 and the fixing portion 120 exhibit the same elastic force or the same reaction force in the pushing direction at the time of pushing center portions of regions having the same size of the fixing portion 110 and the fixing portion 120 with the same force. The definition of the rigidity is not limited to the above-mentioned cases, and it is sufficient that the definition of rigidity falls within the meaning of the term which those who are skilled in the art ordinarily comprehend.

The fixing portion 110 has an arm portion 111 and a pawl portion 112. The arm portion 111 is a rectangular flat-plate-like portion extending downward (toward the minus side in the Z axis direction) from an upper surface portion of the high position portion 101. The pawl portion 112 is a portion disposed on a distal end of the arm portion 111 and protruding outward (toward the minus side in the Y axis direction). In the same manner as the fixing portion 110, the fixing portion 120 has an arm portion 121 and a pawl portion 122. The arm portion 121 is a rectangular flat-plate-like portion extending downward (toward the minus side in the Z axis direction) from an upper surface portion of the low position portion 102. The pawl portion 122 is a portion disposed on a distal end of the arm portion 121, and protruding outward (toward the minus side in the Y axis direction). That is, the arm portion 111 and the arm portion 121 have the same shape and the same size, and the pawl portion 112 and the pawl portion 122 have the same shape and the same size. To be more specific, the arm portion 111 and the arm portion 121 have the same width in the X axis direction, the same height in the Z axis direction, and the same thickness in the Y axis direction.

As shown in FIG. 4, the intermediate member 220 has engaging portions 221 with which the pawl portions 112 respectively engage, and engaging portions 222 with which the pawl portions 122 respectively engage. The engaging portions 221, 222 are respectively formed as parts of the peripheral wall 225 of the intermediate member 220. To be more specific, the engaging portions 221 are formed on both end portions of the intermediate member 220 in the Y axis direction of an end portion on the minus side in the X axis direction corresponding to the pawl portions 112 of the fixing portions 110 respectively. The engaging portions 221 are formed on both end portions of the intermediate member 220 in the Y axis direction of an end portion on the plus side in the X axis direction corresponding to the pawl portions 112 of the fixing portions 110 respectively. Four engaging portions 222 are disposed within a region of the intermediate member 220 closer to the center in the X axis direction of an end portion on the plus side in the Y axis direction corresponding to the pawl portions 122 of four fixing portions 120. Two engaging portions 222 are disposed within a region of the intermediate member 220 closer to the center in the X axis direction of an end portion on the minus side in the Y axis direction corresponding to the pawl portions 122 of two fixing portions 120.

To be more specific, opening portions 221a are formed in the intermediate member 220 at positions below the engaging portions 221 respectively, the pawl portions 112 are inserted into the opening portions 221a, and the pawl portions 112 engage with the engaging portions 221 respectively. In the same manner, opening portions 222a are formed in the intermediate member 220 at positions below the engaging portions 222 respectively, the pawl portions 122 are inserted into the opening portions 222a, and the pawl portions 122 engage with the engaging portions 222 respectively.

The pawl portions 112 are disposed at a position higher than the pawl portions 122 and hence, the engaging portions 221 are disposed at a position higher than the engaging portions 222. That is, upper edges of the opening portions 221a are disposed at a position higher than upper edges of the opening portions 222a. To be more specific, the opening portions 221a are formed larger than the opening portions 222a in a height direction. A depth and a width of the opening portion 221a are equal to those of the opening portion 222a. The opening portion 221a may have the same size as the opening portion 222a in the height direction, and the opening portions 221a may be formed at a position higher than the opening portions 222a.

The opening portions 221a and the opening portions 222a are formed in the peripheral wall 225 of the intermediate member 220 at positions disposed adjacently to the bus bar arranging portions 227 respectively. Further, rectangular holes for connecting the bus bars 30 and the electrode terminals 22, 23 of the energy storage devices 20 to each other are formed in the intermediate member 220 at both sides of each bus bar arranging portion in the X axis direction. Portions of the peripheral wall 225 where the opening portions 221a and the opening portions 222a are formed are connected with the bus bar arranging portions 227 and hence, the portions are minimally deflected compared to portions of the peripheral wall 225 disposed adjacently to the rectangular holes. Such a configuration is suitable for fixing the fixing portions 110, 120 and the engaging portions 221, 222 to each other respectively.

With such a configuration, the plurality of fixing portions 110, 120 engage with the intermediate member 220. That is, the lid body 100 (second outer case) is fixed to the outer case body 200 (first outer case) by the plurality of fixing portions 110, 120. The configuration where the lid body 100 is fixed to the outer case body 200 by the plurality of fixing portions 110, 120 (that is, the configuration where the fixing portions 110, 120 engage with the intermediate member 220) is described in more detail hereinafter.

Figure 5A:
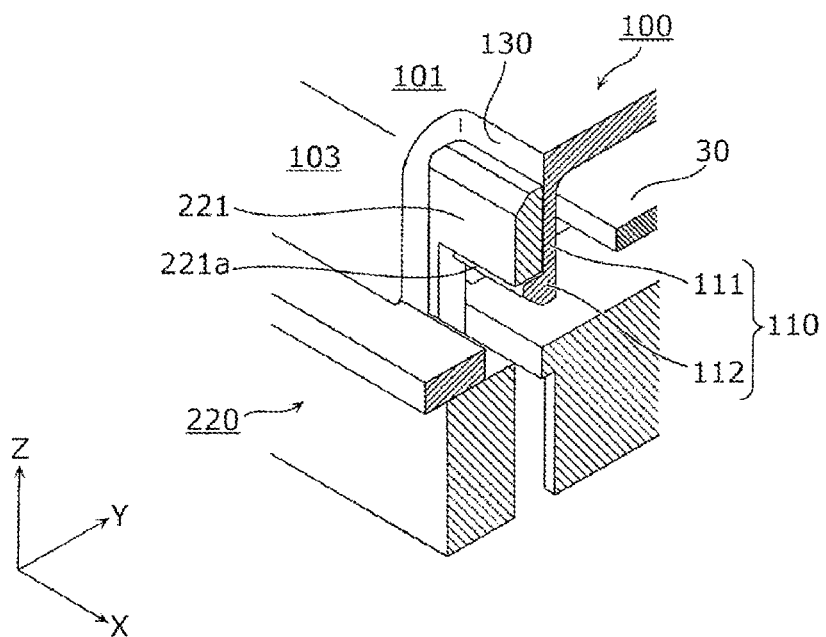
FIG. 5A is a perspective view showing a cross section of the configuration where a fixing portion at a high position of the lid body according to the embodiment engages with the intermediate member.
Figure 5B:
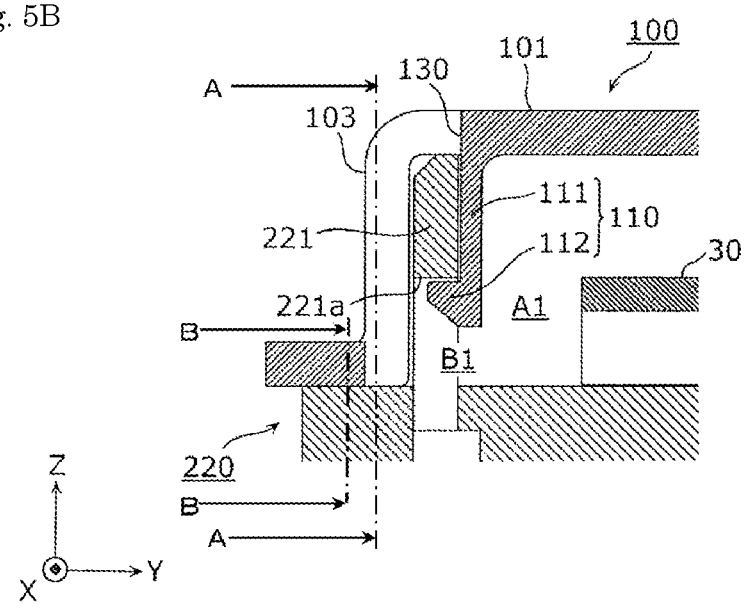
FIG. 5B is a cross-sectional view showing the configuration where the fixing portion at the high position of the lid body according to the embodiment engages with the intermediate member.
Figure 6A:
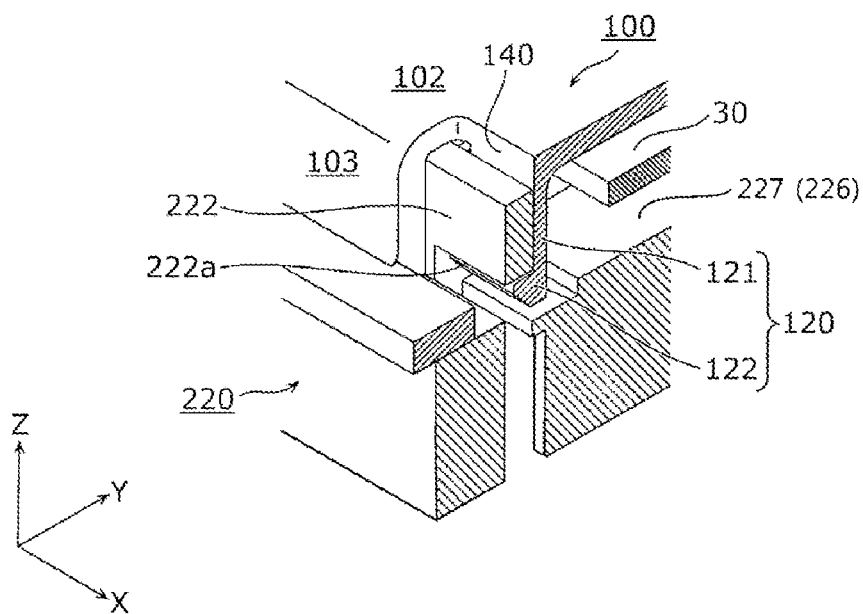
FIG. 6A is a perspective view showing a cross section of the configuration where the fixing portion at a low position of the lid body according to the embodiment engages with the intermediate member.
Figure 6B:
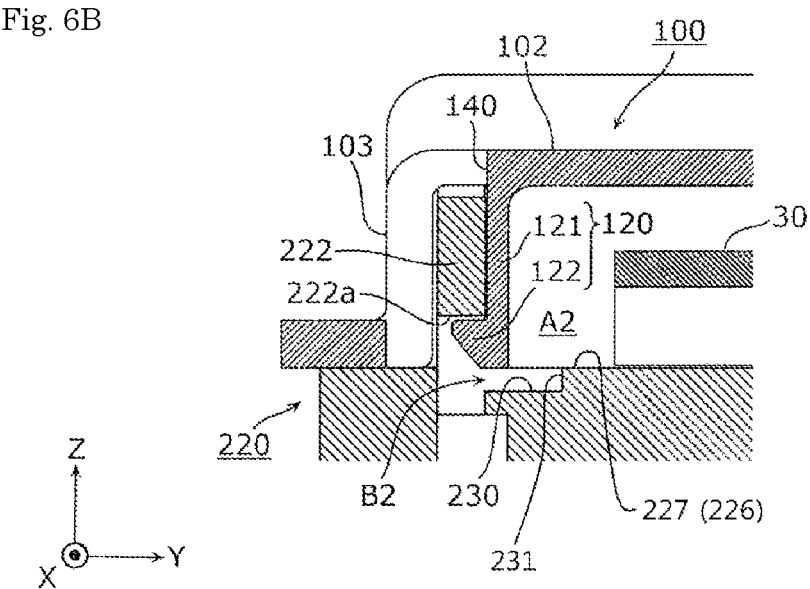
FIG. 6B is a cross-sectional view showing the configuration where the fixing portion at the low position of the lid body according to the embodiment engages with the intermediate member.

FIG. 5A is a perspective view showing a cross section of the configuration where the fixing portion 110 disposed at the high position of the lid body 100 according to this embodiment engages with the intermediate member 220, and FIG. 5B is a cross-sectional view showing the configuration shown in FIG. 5A as viewed from the plus side in the X axis direction. FIG. 6A is a perspective view showing a cross section of the configuration where the fixing portion 120 disposed at the low position of the lid body 100 according to this embodiment engages with the intermediate member 220, and FIG. 6B is a cross-sectional view showing the configuration shown in FIG. 6A as viewed from the plus side in the X axis direction. FIG. 8 is a cross-sectional view showing the configuration of the energy storage apparatus 1 according to this embodiment, and is a cross-sectional view of the peripheral portion of the energy storage apparatus 1 parallel to the Z axis on the minus side in the Y axis direction (cross-sectional view at a position taken along line B-B in FIG. 5B). In FIG. 8, the energy storage devices 20 are not shown.

As shown in these drawings, the lid body 100 is fixed to the intermediate member 220 by at least one of the plurality of fixing portions 110, 120. That is, at least one of the fixing portions engages the intermediate member 220 which is the bus bar frame and hence, the lid body 100 is fixed to the bus bar frame. A portion of the intermediate member 220 with which at least one of the fixing portions engages is disposed in the recessed portion 130 or the recessed portion 140.

In this embodiment, at least one of the fixing portions means all of the plurality of fixing portions 110, 120. That is, the lid body 100 is fixed to the intermediate member 220 such that all of the fixing portions 110, 120 of the lid body 100 engage with the intermediate member 220. As shown in FIG. 8, the plurality of fixing portions 110 and the plurality of fixing portions 120 of the lid body 100 are disposed at different positions in an arrangement direction (Z axis direction) of the lid body 100 and the outer case body 200 (the housing 210 and the intermediate member 220). The fixing portions 110 disposed at the high position portions 101 of the lid body 100 engage with the corresponding engaging portions 221, and the fixing portions 120 disposed at the low position portion 102 of the lid body 100 engage with the corresponding engaging portions 222. In FIG. 8, proximal portions of the arm portions 111 of the fixing portions 110 are shown, and proximal portions of the arm portions 121 of the fixing portions 120 are also shown. As shown in FIG. 5A and FIG. 5B, each engaging portion 221 of the intermediate member 220 with which the fixing portion 110 engages is disposed in the recessed portion 130. As shown in FIG. 6A and FIG. 6B, each engaging portion 222 of the intermediate member 220 which the fixing portion 120 engages is disposed in the recessed portion 140.

As shown in FIG. 5A and FIG. 6A, the side wall 106 of the lid body 100 is disposed outside the peripheral wall 225 of the intermediate member. On the other hand, the fixing portions 110, 120 are disposed inside the engaging portions 221, 222. In this embodiment, the arm portions 111 of the fixing portions 110 and the arm portions 121 of the fixing portions 120 have elasticity. Since the engaging portions 221, 222 are brought into contact with the arm portions 111, 121 respectively from the outside, the fixing portions 110 and the engaging portions 221 are fixed to each other with certainty due to an elastic action of the arm portions, and the fixing portions 120 and the engaging portions 222 are fixed to each other with certainty due to an elastic action of the arm portions. Further, it is sufficient that the side wall 106 of the lid body 100 is made to cover the peripheral wall 225 of the intermediate member 220 from the outside and hence, operability can be improved.

With such a configuration, the engaging portion 221 is disposed more inside (the plus side in the Y axis direction) than the outer surface 103 of the high position portion 101 of the lid body 100, and the engaging portion 222 is disposed more inside (the plus side in the Y axis direction) than the outer surface 103 of the low position portion 102 of the lid body 100.

The plurality of fixing portions 110 and the plurality of fixing portions 120 respectively have the same contact area with the intermediate member 220 of the outer case body 200. That is, a contact area between the pawl portion 112 of the fixing portion 110 and the engaging portion 221 of the intermediate member 220 and a contact area between the pawl portion 122 of the fixing portion 120 and the engaging portion 222 of the intermediate member 220 are equal to each other.

At the time of inserting the pawl portion 112 of the fixing portion 110 into the opening portion 221a of the intermediate member 220, the pawl portion 112 passes through the plus side in the Y axis direction of the engaging portion 221 and is inserted into the opening portion 221a in a state where the arm portion 111 of the fixing portion 110 is elastically deformed and warped toward the plus side in the Y axis direction. Accordingly, to prevent the fixing portion 110 from interfering with other members (the bus bar 30 and the like), a space (a space A1 in FIG. 5B) is formed on the plus side in the Y axis direction at a position where the fixing portion 110 is disposed. In the same manner, to prevent the fixing portion 120 from interfering with other members (the bus bar 30 and the like), a space (a space A2 in FIG. 6B) is formed also on the plus side in the Y axis direction at a position where the fixing portion 120 is disposed.

Further, to prevent the pawl portion 112 from interfering with other members (other portions of the intermediate member 220) in a height direction after the pawl portion 112 of the fixing portion 110 is inserted into the opening portion 221a of the intermediate member 220, a space (a space B1 in FIG. 5B) is formed on the minus side in the Z axis direction of the pawl portion 112. Particularly, the fixing portion 120 is disposed at a position lower than a position of the fixing portion 110. Accordingly, to prevent the pawl portion 122 from interfering with the floor portion 226 (bus bar arranging portion 227) of the intermediate member 220, a space (a space B2 in FIG. 6B) is formed also on the minus side in the Z axis direction of the pawl portion 122 by forming a stepped portion 230 on the intermediate member 220. Further, to make the fixing portion 120 elastically movable at the time of mounting/dismounting the fixing portion 120, a depth size (in the Y axis direction) of the stepped portion 230 is set such that the stepped portion 230 extends from a position of the pawl portion 122 toward the center side of the floor portion 226. That is, a deep-side wall 231 of the stepped portion is raised at the position away from the position of the pawl portion 122 toward the center side of the floor portion 226. A groove, a through hole or the like may be formed in the intermediate member 220 at a position below the pawl portion 122 in place of the stepped portion 230.

Figure 9:
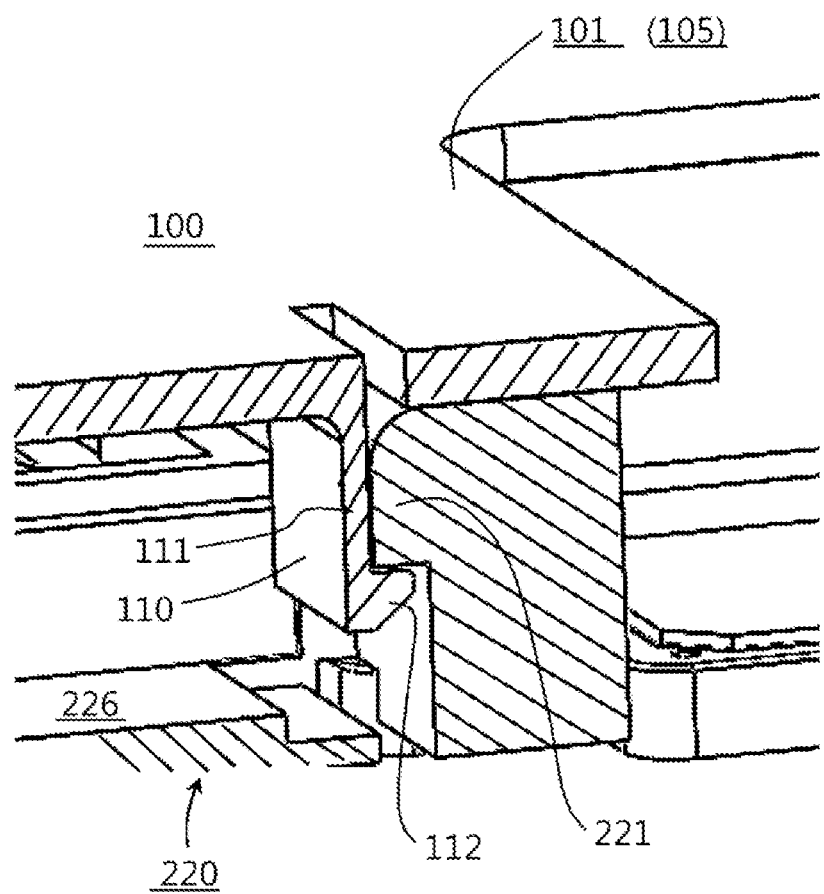
FIG. 9 is a perspective view showing a cross section of another configuration where the fixing portion at a high position of the lid body according to the embodiment engages with the intermediate member (a perspective view of a cross section taken along line C-C in FIG. 1).

FIG. 9 is a cross-sectional perspective view taken along line C-C in FIG. 1. FIG. 9 shows a mode where the fixing portion 110 of the high position portion 101 of the lid body 100 is formed on an inner surface side of the upper wall 105. In the energy storage apparatus 1, two corner portions of the lid body 100 are cut out for exposing total electrode terminals. Accordingly, each fixing portion 110 disposed close to the cutout portion is disposed at a position closer to the center in the Y axis direction of the upper wall 105 of the lid body 100. In such a configuration, the engaging portion 221 which engages with the fixing portion 110 is formed on the floor portion 226 of the intermediate member 220. A portion where the engaging portion 221 is formed forms a part of the peripheral wall 225. A space disposed below the engaging portion 221 is not formed of an opening portion which penetrates the intermediate member 220 but is formed of a recessed portion. In this manner, the portion where the fixing portion is formed may be formed not only on the side wall 106 of the lid body 100 but also on the portion of the lid body 100 disposed closer to the center of the upper wall 105 of the lid body 100. With such a configuration, the degree of freedom in forming the portions where the fixing portions 110, 120 are formed is increased. In the above-mentioned embodiment, the engaging portion 221 is formed as a part of the peripheral wall 225 of the intermediate member. However, the engaging portion 221 may be formed not on the peripheral wall but at a position disposed closer to the center of the floor portion 226 in an upright manner. For example, the engaging portion 221 may be formed on an upright wall extending along the rectangular hole where the bus bar 30 is disposed.

As described heretofore, according to the energy storage apparatus 1 of the embodiment of the present invention, the lid body 100 which forms the second outer case is fixed to the outer case body 200 which forms the first outer case by the plurality of fixing portions 110, 120. The plurality of fixing portions 110 and the plurality of fixing portions 120 are disposed at different positions in the arrangement direction of the outer case body 200 and the lid body 100, and have the same rigidity. That is, although the plurality of fixing portions 110 and the plurality of fixing portions 120 of the lid body 100 have the different arrangement heights, the plurality of fixing portions 110 and the plurality of fixing portions 120 of the lid body 100 have the same rigidity and hence, the plurality of fixing portions 110 and the plurality of fixing portions 120 have substantially the same breaking property whereby it is possible to suppress the occurrence of a case where some fixing portions are broken earlier than remaining fixing portions. In this manner, according to the energy storage apparatus 1, in the configuration where two members (the outer case body 200 and the lid body 100) which form the outer case 10 are fixed to each other by the plurality of fixing portions 110, 120, it is possible to suppress the occurrence of a case where some fixing portions out of the plurality of fixing portions 110, 120 are damaged earlier than the remaining fixing portions.

The plurality of fixing portions 110 and the plurality of fixing portions 120 of the lid body 100 have the same shape and the same size and hence, the plurality of fixing portions 110 and the plurality of fixing portions 120 form portions which have the same rigidity.

The plurality of fixing portions 110 and the plurality of fixing portions 120 of the lid body 100 have the same contact area with the outer case body 200 (intermediate member 220) and hence, the same stress is applied to the plurality of fixing portions 110 and the plurality of fixing portions 120 whereby it is possible to suppress the occurrence of a case where some fixing portions out of the plurality of fixing portions 110, 120 are damaged earlier than the remaining fixing portions.

As shown in FIG. 1 and FIG. 2, the plurality of fixing portions 110, 120 of the lid body 100 are arranged along the arrangement direction of the energy storage devices 20. It can also be said that the plurality of fixing portions 110, 120 are arranged at positions which opposedly face short side surfaces of the energy storage devices 20. Such an arrangement is minimally affected by bulging of the energy storage devices 20 and hence, the occurrence of a damage on the fixing portions can be suppressed. During the use of the energy storage device 20, long side surfaces (surfaces intersecting with the X axis direction in FIG. 2) of the case 21 bulge. Accordingly, when the plurality of fixing portions 110, 120 are arranged along the direction intersecting with the arrangement direction of the energy storage devices 20, there may be a case where a stress caused by bulging of the energy storage device 20 is applied to the plurality of fixing portions 110, 120.

The lid body 100 is fixed to the intermediate member 220 which the outer case body 200 has by at least one fixing portion (in this embodiment, the plurality of fixing portions 110, 120). That is, the lid body 100 can be fixed to the outer case body 200 by fixing the lid body 100 to the intermediate member 220.

By making the at least one fixing portion of the lid body 100 engage with the bus bar frame which forms the intermediate member 220, the lid body 100 is fixed to the bus bar frame. That is, the lid body 100 can be fixed to the outer case body 200 by making the at least one fixing portion engage with the bus bar frame.

The at least one fixing portion of the lid body 100 and the engaging portion of the intermediate member 220 engage with each other by arranging the at least one fixing portion of the lid body 100 and the engaging portion of the intermediate member 220 in the recessed portion 130 or 140 of the lid body 100. Accordingly, it is possible to suppress the occurrence of a case where the at least one fixing portion and the engaging portion protrude outward from the outer surface 103 of the lid body 100.

In the lid body 100, the external harness is disposed outside the low position portion 102 which is the portion having the fixing portions 120 on an outer case body 200 side (intermediate member 220 side). That is, by disposing the external harness outside the low portion of the lid body 100, it is possible to effectively make use of a space formed outside the energy storage apparatus by lowering the height of the lid body 100.

The printed circuit board 40 which forms the electric component is disposed inside the high position portion 101 which forms the portion having the fixing portions 110 on a lid body 100 side. That is, by disposing the electric component such as the printed circuit board 40 inside the high portion of the lid body 100, it is possible to effectively make use of a space formed inside the energy storage apparatus by increasing the height of the lid body 100.

Although the energy storage apparatus 1 according to the embodiment of the present invention has been described heretofore, the present invention is not limited to the above-mentioned embodiment. That is, it should be construed that the embodiment disclosed in this specification is only for an exemplifying purpose in all aspects and is not limited. The scope of the present invention is not designated by the above-mentioned description but is designated by Claims, and it is intended that all modifications which fall within the meaning and the scope equivalent to Claims are also included in the scope of the present invention.

For example, in the above-mentioned embodiment, the plurality of fixing portions 110 and the plurality of fixing portions 120 of the lid body 100 are formed to have the same shape and the same size. However, it is sufficient for the fixing portions 110 and the fixing portions 120 to be formed to have the same height. That is, it is sufficient that, out of the plurality of fixing portions 110, 120, the fixing portion 110 disposed at the high position portion 101 which forms the high portion and the fixing portion 120 disposed at the low position portion 102 which forms the low portion are formed to have the same length in the height direction (Z axis direction). For example, the fixing portion 110 and the fixing portion 120 may be formed such that the fixing portion 110 and the fixing portion 120 have the same height, the fixing portion 110 has the smaller thickness than the fixing portion 120, and the fixing portion 110 has the larger width than the fixing portion 120.

With such a configuration, although the plurality of fixing portions 110 and the plurality of fixing portions 120 of the lid body 100 have the different arrangement heights, the plurality of fixing portions 110 and the plurality of fixing portions 120 are formed with the same length in the height direction and hence, the plurality of fixing portions 110 and the plurality of fixing portions 120 have substantially the same breaking property whereby it is possible to suppress the occurrence of the case where some fixing portions are broken earlier than the remaining fixing portions. Accordingly, also with the energy storage apparatus 1 having such a configuration, in the configuration where two members (the outer case body 200 and the lid body 100) which form the outer case 10 are fixed to each other by the plurality of fixing portions 110, 120, it is possible to suppress the occurrence of a case where some fixing portions out of the plurality of fixing portions 110, 120 are damaged earlier than the remaining fixing portions.

Alternatively, the plurality of fixing portions 110 and the plurality of fixing portions 120 may be equal with respect to at least one of a height, a thickness, and a width. For example, even in the case where the fixing portion 110 and the fixing portion 120 have the same thickness and differ from each other in height and width, the fixing portion 110 and the fixing portion 120 can be formed with the same rigidity. The same goes for the case where the fixing portion 110 and the fixing portion 120 have the same width. In this manner, the plurality of fixing portions 110 and the plurality of fixing portions 120 of the lid body 100 may be formed with the same rigidity by making the plurality of fixing portions 110 and the plurality of fixing portions 120 of the lid body 100 equal with respect to at least one of a height, a thickness, and a width.

Alternatively, the plurality of fixing portions 110 and the plurality of fixing portions 120 may differ from each other with respect to all of a height, a thickness and a width. Also in this case, provided that the plurality of fixing portions 110 and the plurality of fixing portions 120 can be formed with the same rigidity, it is possible to suppress the occurrence of a case where some fixing portions out of the plurality of fixing portions 110, 120 are damaged earlier than the remaining fixing portions.

In the above-mentioned embodiment, the lid body 100 is an integrally molded product, and the plurality of fixing portions 110 and the plurality of fixing portions 120 are made of the same material as the lid body 100. However, the fixing portions 110, 120 may be formed as portions separate from the lid body 100. In this case, the fixing portions 110 and the fixing portions 120 may be made of different materials.

In the above-mentioned embodiment, the plurality of fixing portions 110 and the plurality of fixing portions 120 are formed to have the same contact area with the intermediate member 220. However, when the plurality of fixing portions 110 and the plurality of fixing portions 120 receive the same stress from the intermediate member 220, the plurality of fixing portions 110 and the plurality of fixing portions 120 may differ from each other in contact area with the intermediate member 220.

In the above-mentioned embodiment, the intermediate member 220 to which the lid body 100 is fixed is the bus bar frame. However, the intermediate member 220 is not limited to the bus bar frame, and may be a spacer which is disposed on the energy storage devices 20, spacers each of which is disposed between the energy storage devices 20 or the like, for example.

In the above-mentioned embodiment, the lid body 100 is fixed to the outer case body 200 such that the lid body 100 is fixed to the intermediate member 220 by the plurality of fixing portions 110, 120. However, the lid body 100 may be fixed to the intermediate member 220 by some fixing portions out of the plurality of fixing portions 110, 120. The lid body 100 may be fixed to the outer case body 200 such that the lid body 100 is fixed to the housing 210 in place of the intermediate member 220. The lid body 100 may be fixed to the outer case body 200 such that the lid body 100 is fixed to the intermediate member 220 by some fixing portions and is fixed to the housing 210 by remaining fixing portions. Further, the lid body 100 may be fixed to the other member which the outer case body 200 includes. That is, the lid body 100 may be fixed by any desired number of fixing portions or may be fixed to any desired member of the outer case body 200.

In the above-mentioned embodiment, the lid body 100 is fixed to the intermediate member 220 by making the plurality of fixing portions 110, 120 engage with the intermediate member 220. However, the fixing mode is not limited to the above-mentioned engagement, and the lid body 100 may be fixed to the intermediate member 220 by fitting engagement, press-fitting, adhesion (sticking, melting, welding), fastening using screws or the like.

In the above-mentioned embodiment, the recessed portions 130, 140 are formed on the lid body 100, and the fixing portions 110, 120 and the engaging portions 221, 222 are disposed in the recessed portions 130, 140 respectively. However, the recessed portions 130, 140 may not be formed on the lid body 100.

In the above-mentioned embodiment, the external harness is disposed outside the low position portion 102, and the printed circuit board 40 is disposed inside the high position portion 101. However, a component other than the external harness may be disposed outside the low position portion 102, and a component other than the printed circuit board 40 may be disposed inside the high position portion 101. For example, an electric component such as a relay, a fuse, a thermistor or a component other than an electric component may be disposed inside the high position portion 101.

In the above-mentioned embodiment, the lid body 100 has the plurality of fixing portions 110, 120. However, the lid body 100 may have one fixing portion 110 and a plurality of fixing portions 120, may have a plurality of fixing portions 110 and one fixing portion 120, or may have one fixing portion 110 and one fixing portion 120.

In this above-mentioned embodiment, the outer case body 200 is formed of the box-shaped housing 210 and the intermediate member 220. However, the outer case body 200 is not limited to such a configuration. The energy storage apparatus 1 can use, as a member for holding the plurality of energy storage devices 20, a different holding member in place of a box-shaped member such as the housing 210. For example, a holding member which is formed of a pair of end plates and a connecting member for connecting the pair of end plates to each other can be used. In this case, the plurality of energy storage devices 20 are sandwiched by the pair of end plates, and the pair of end plates are connected to each other by the connecting member thus holding the plurality of energy storage devices 20. In such a configuration, an intermediate member is fixed to the holding member which is formed of the pair of end plates and the connecting member for connecting the pair of end plates to each other. That is, the outer case body 200 may be formed of the pair of end plates, the connecting member for connecting the pair of end plates to each other, and the intermediate member 220. In this case, the intermediate member 220 may be fixed to the connecting member, may be fixed to the end plates, or may be fixed to both of them.

In the above-mentioned embodiment, the outer case body 200 (the housing 210 and the intermediate member 220) is used as one example of the first outer case, and the lid body 100 is used as one example of the second outer case. However, the combination of the first outer case and the second outer case is not limited to the above-mentioned configuration, and a combination of any desired members may be defined as the combination of the first outer case and the second outer case. For example, the lid body 100 may be used as one example of the first outer case, and the outer case body 200 (the housing 210 and the intermediate member 220) may be used as one example of the second outer case. That is, the configuration may be adopted where the constitutional element (the intermediate member 220, the housing 210 or the like) of the outer case body 200 has the fixing portions, and the constitutional element is fixed to the lid body 100 or the like by the fixing portions. In this case, for example, the intermediate member 220, the housing 210 or the like has fixing portions each of which has a arm portion and a pawl portion, and the lid body 100 or the like has openings or recessed portions which engage with the fixing portions.

As another example, the configuration may be adopted where an intermediate member is formed of two members disposed in layers, that is, a first intermediate member and a second intermediate member, and the first intermediate member is used as the first outer case while the second intermediate member is used as the second outer case. As still another example, the present invention is applicable to the configuration where an energy storage apparatus includes a holder and a member such as a cover which is fixed to the sides (in the X axis direction or in the Y axis direction) of the holder, and the holder is used as the first outer case while the cover is used as the second outer case.

Embodiments which are acquired by arbitrarily combining the constitutional elements included in the above-mentioned embodiment and modifications of the embodiment are also included in the scope of the present invention.

The present invention can be realized not only in the form of the energy storage apparatus 1 but also in the form of the outer case 10 (the first outer case and the second outer case) which the energy storage apparatus 1 includes.

The technique disclosed in this specification includes the configuration where the first outer case and the second outer case which the energy storage apparatus includes are used as the first member and the second member respectively. For example, the intermediate member 220 may be used as the first member, and the lid body 100 may be used as the second member. For example, the technique disclosed in this specification may be applied to a case where an energy storage apparatus includes a first portion and a second portion which is detachably mounted on the first portion, and the first portion and the second portion are fixed to each other in an arrangement direction of the first portion and the second portion. For example, the technique disclosed in this specification may be applied to a case where an energy storage apparatus includes a body which holds energy storage devices and an electric equipment box which is detachably mounted on the body, and the body or a portion which is a part of the body is used as the first member while the electric equipment box or a portion of the electric equipment box is used as the second member. The above-mentioned configurations are provided merely as one example, and the technique disclosed in this specification is applicable to various configurations.

INDUSTRIAL APPLICABILITY

The present invention is applicable to an energy storage apparatus which includes energy storage devices such as lithium ion secondary batteries or the like.

DESCRIPTION OF REFERENCE SIGNS

1: energy storage apparatus
10: outer case
20: energy storage device
40: printed circuit board
100: lid body
101: high position portion
102: low position portion
103: outer surface
110, 120: fixing portion
130, 140: recessed portion
200: outer case body
220: intermediate member
221, 222: engaging portion

The invention claimed is:

1. An energy storage apparatus, comprising:
an energy storage device; and
an outer case,
wherein the outer case includes:
 a first outer case; and
 a second outer case including a plurality of fixing portions and being fixed to the first outer case by the plurality of fixing portions,
wherein the plurality of fixing portions are arranged at different positions in an arrangement direction of the first outer case and the second outer case,
wherein the first outer case includes an intermediate member disposed between the energy storage device and the second outer case, and
wherein the second outer case is fixed to the intermediate member by at least one fixing portion out of the plurality of fixing portions.

2. The energy storage apparatus according to claim 1, wherein the intermediate member comprises a bus bar frame which holds a bus bar connected to the energy storage device, and
wherein the second outer case is fixed to the bus bar frame by making the at least one fixing portion engage with the bus bar frame.

3. The energy storage apparatus according to claim 2, wherein a recessed portion is formed on the second outer case by arranging the at least one fixing portion inward from an outer surface of the second outer case, and
wherein a portion of the bus bar frame with which the at least one fixing portion engages is disposed in the recessed portion.

4. The energy storage apparatus according to claim 1, wherein an external harness, which is electrically connected with the energy storage device, is disposed outside a portion of the second outer case having a fixing portion disposed on a first outer case side in the arrangement direction, out of the plurality of fixing portions.

5. The energy storage apparatus according to claim 1, wherein an electric component, which is electrically connected with the energy storage device, is disposed inside a portion of the second outer case having a fixing portion disposed on a second outer case side in the arrangement direction, out of the plurality of fixing portions.

6. The energy storage apparatus according to claim 1, wherein the plurality of fixing portions have a same shape and a same size, and
wherein the plurality of fixing portions have a same contact area with the first outer case.

7. The energy storage apparatus according to claim 1, wherein an external harness, which is electrically connected with the energy storage device, is disposed outside a portion of the second outer case having a fixing portion disposed on a first outer case side in the arrangement direction, out of the plurality of fixing portions.

8. The energy storage apparatus according to claim 1, wherein an electric component, which is electrically connected with the energy storage device, is disposed inside a portion of the second outer case having a fixing portion disposed on a second outer case side in the arrangement direction, out of the plurality of fixing portions.

9. An energy storage apparatus, comprising:
an energy storage device; and
an outer case,
wherein the outer case includes:
  a first outer case; and
  a second outer case including a plurality of fixing portions and being fixed to the first outer case by the plurality of fixing portions,
wherein the second outer case includes a high portion and a low portion,
wherein, out of the plurality of fixing portions, the fixing portion disposed at the high portion and the fixing portion disposed at the low portion are formed with a same length in a height direction,
wherein the first outer case includes an intermediate member disposed between the energy storage device and the second outer case, and
wherein the second outer case is fixed to the intermediate member by at least one fixing portion out of the plurality of fixing portions.

10. The energy storage apparatus according to claim 9, wherein the plurality of fixing portions have a same shape and a same size, and
wherein the plurality of fixing portions have a same contact area with the first outer case.

11. The energy storage apparatus according to claim 9, wherein the intermediate member incudes a bus bar frame which holds a bus bar connected to the energy storage device, and
wherein the second outer case is fixed to the bus bar frame by making the at least one fixing portion engage with the bus bar frame.

12. The energy storage apparatus according to claim 9, wherein an external harness, which is electrically connected with the energy storage device, is disposed outside a portion of the second outer case having a fixing portion disposed on a first outer case side in the arrangement direction, out of the plurality of fixing portions.

13. The energy storage apparatus according to claim 9, wherein an electric component, which is electrically connected with the energy storage device, is disposed inside a portion of the second outer case having a fixing portion disposed on a second outer case side in the arrangement direction, out of the plurality of fixing portions.

14. The energy storage apparatus according to claim 9, wherein the high portion and the low portion of the second outer case are positioned side by side in a first direction that is perpendicular to the height direction.

15. The energy storage apparatus according to claim 9, wherein the fixing portion disposed at the high portion penetrates into a side wall of the second outer case in a depth direction of the fixing portion.

* * * * *